United States Patent [19]  
Struttmann

[11] 3,977,740  
[45] Aug. 31, 1976

[54] ROLLER BEARING IMPROVEMENT

[75] Inventor: Hilarius S. Struttmann, Ithaca, N.Y.

[73] Assignee: Borg-Warner Corporation, Chicago, Ill.

[22] Filed: Nov. 13, 1974

[21] Appl. No.: 523,393

[52] U.S. Cl. ............................ 308/194; 29/149.5 R; 308/207 R
[51] Int. Cl.² ..................... B21D 53/12; B21K 1/02; F16C 27/04
[58] Field of Search ............... 308/194, 207, 72, 29, 308/214, 196, 207 R, 202; 29/148.5 R

[56] References Cited
UNITED STATES PATENTS

| | | | |
|---|---|---|---|
| 3,773,397 | 11/1973 | Struttmann | 308/194 |
| 3,829,182 | 8/1974 | Struttmann | 308/194 |
| 3,918,776 | 11/1975 | Zimmer et al. | 308/194 |

Primary Examiner—M. H. Wood, Jr.  
Assistant Examiner—Richard A. Bertsch  
Attorney, Agent, or Firm—Aubrey L. Burgess

[57] ABSTRACT

A roller bearing cartridge and a method of making the same is disclosed. The cartridge is constructed with an outer race assembly constructed of two identical parts, centrally joined together, such that openings are provided for a locking or locating pin and for the passage of lubricant regardless of the type of housing in which the cartridge is used, which housings have lubrication fittings and cavities for locking or locating pins in locations which differ from one another.

The locking and locating pins restrict relative rotation between the outer race which is constructed with an arcuate outer surface and the housing which has the opening defined by an arcuate surface to receive the cartridge. The restricted relative rotation is between the cartridge and the housing and is such to provide sufficient relative rotation to permit the bearing assembly to be self-aligning to accommodate shaft misalignment relative to the housing support.

In that locking and locating pins may be sheared off by severe shaft misalignment, there is also disclosed a construction limiting self-alignment relative rotation between the cartridge and the housing to some predetermined amount.

10 Claims, 8 Drawing Figures

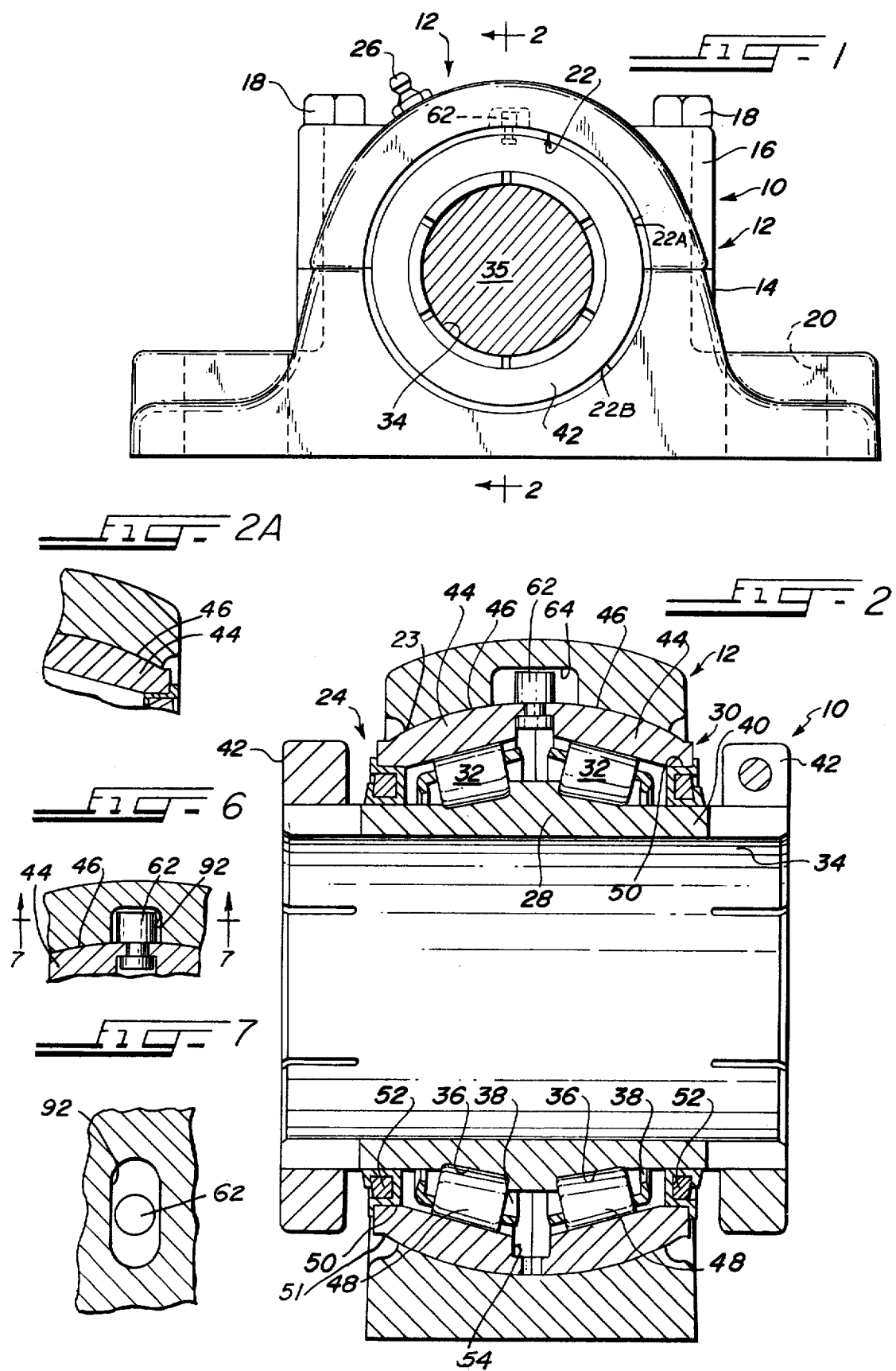

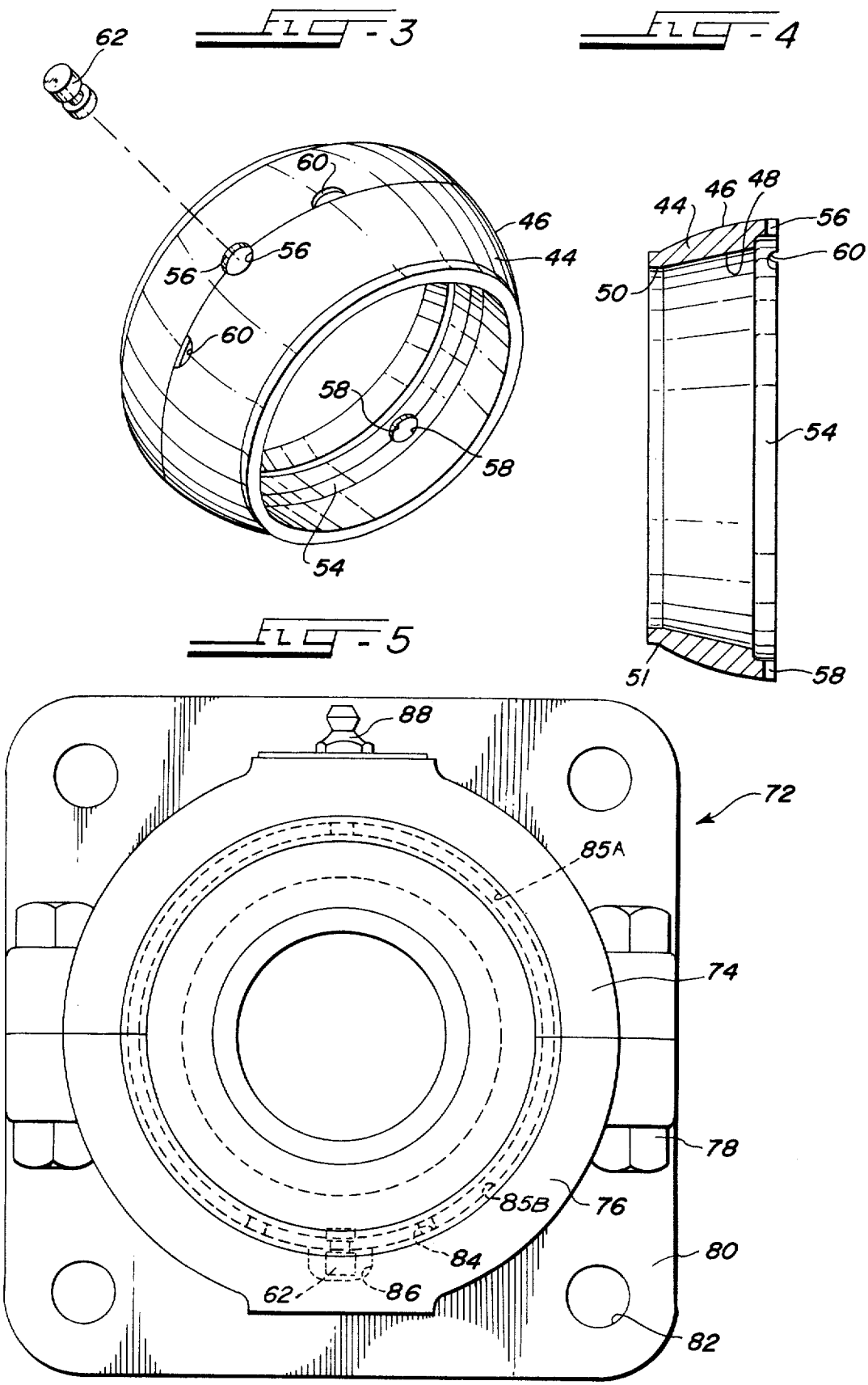

ROLLER BEARING IMPROVEMENT

BACKGROUND OF THE INVENTION

Roller bearing cartridges or assemblies are usable in various forms of housings, as for example, pillow blocks and flange blocks both of which are fixed to a support. There are several types of pillow blocks in general use, one difference being in the manner of inserting and removing the actual bearing unit or, as more descriptively identified, a bearing cartridge constructed of inner and outer races with rows of rollers. For example, pillow blocks are made in two pieces which are bolted together; they are made with loading slots through which the cartridge is inserted and removed, and they are made with an enlarged opening to receive adapter rings to hold the cartridge in proper position. In any event, pillow blocks and flange blocks are provided with a nipple or fitting and a passage through which lubricant is introduced into the housing and into the cartridge to lubricate the rollers, and also with a cavity to receive a locking or locating pin which extends from the cartridge and which limits relative rotation between the outer race, the bearing cartridge and the housing. Rotation of the outer race with the shaft is undesirable; movement in planes passing through the major axis of the shaft is desirable, so that the bearing is self-aligning to accommodate slight shaft misalignment. However, self-aligning movement control of the self-alignment movement is desirable, so that the locating or locking pin is not sheared off by excessive movement which could cause damage to the assembly.

Roller bearing cartridge of the type being described herein are described in U.S. Pat. Nos. 3,773,397, issued Nov. 20, 1973, and 3,829,182, issued Aug. 13, 1974, both granted to the assignee of this application by the applicant of this application.

U.S. Pat. No. 3,773,397, describes and claims a unique manner of generating the arcuate surface of the housing opening. U.S. Pat. No. 3,829,182, describes and claims a unique locking or locating pin which is received in a housing cavity to limit relative movement between the bearing cartridge and the housing.

Both patents illustrate an outer race having cylindrical portions extending outwardly from the outer arcuate surfaced outer race and both patents illustrate the housing having exterior walls joining the arcuate surface of the housing opening. The concept of using the structure of the outer race and the housing to limit the pivoting movement of the bearing cartridge to accommodate shaft misalignment is not described or claimed in the aforesaid patents.

THE INVENTION

This invention relates to roller bearing assemblies comprising a housing adapted to be fixed to a support, which housing has a central opening or bore defined by an arcuate surface and which receives a roller bearing unit or cartridge. The cartridge, preferably constructed as a sealed unit, comprises an inner race with spaced raceways, an outer race with spaced raceways, and rows of rollers, each roller of a row contacting the adjacent raceways of the inner and outer races. In accordance with this invention, the outer race is constructed of two, substantially identical parts centrally connected by being welded together, the welding being accomplished after assembly of the inner race and the rows of rollers, by using the electron beam welding technique. It has been found that the electron beam welding technique permits welding the parts without material distortion. When assembled, the outer race presents an arcuate outer surface for contact with the arcuate surface of the housing opening or bore.

The assembly is also so constructed to limit the relative rotation between the cartridge and the housing; rotation of the outer race with the shaft is, of course, undesirable in that the function of the anti-friction elements, the rollers running on the raceways is defeated. Some relative rotation between the outer race and the housing is desirable especially in planes which pass through the major, longitudinal axis of the shaft, in order to accommodate shaft misalignment relative to the housing support. This self-alignment movement may be described as the ability of the bearing cartridge to pivot within the confines of the housing opening about its geometric center.

To limit the relative rotation between the cartridge and the housing (which includes the pivoting of the cartridge within the housing opening about its geometric center), the cartridge is provided with a locking or locating pin and received in a cavity in the housing. This pin also locates the cartridge relative to a grease or lubricating fitting attached to the housing, so that lubrication can be supplied to the cartridge and the rollers. Severe misalignment of the shaft can shear the locating pin creating a condition leading to potential bearing damage. Thus, according to this invention, the bearing assembly is constructed so that a built-in stop is provided against undue and abnormal self-aligning relative movement between the cartridge and the housing. This built-in stop comprises a flange configuration of the outer race which cooperates with the housing to so limit or stop the relative rotation or pivoting between the cartridge and the housing at a predetermined angular value measured at the geometric center of the cartridge. Another innovation which can be used in conjunction with or for light load applications, as an alternative, is to shape the cavity in the housing for the locking or locating pin to be elongated in the direction of the major axis of the shaft and restricted in a direction normal thereto (as for example, an oval), so that the outer race is restricted severely in one direction, especially from rotating with the shaft. The minor axis of the cavity is of such dimension to freely accept the pin; the major axis of the cavity is of such length to permit the self-aligning pivoting movement as desired.

In the forms of housings which have been discussed, the location of the lubricant fitting or nipple and the cavity for receiving the locking or locating pin are usually different. Generally several different arrangements of cartridges are required, one for each particular housing type. However, by following the teachings of this invention, a universal cartridge can be manufactured which is adapted for use in any of the housing types before enumerated and which provides not only the locking or locating pin but also at least one opening generally aligned with the lubricant fitting or nipple of the housing insuring a substantially direct lubricant inlet into the cartridge and to the moving elements of the cartridge.

This is accomplished by constructing the outer race member of the cartridge of two, identical parts, each race half being provided with substantially semi-circular openings or slots at the mating edges, one of which is diametrically opposite to a second opening and with a third opening or slot intermediate the first two openings or slots. When a pair of these race halves is assembled, the diametrically opposed openings or slots are aligned with one another with a locating pin in one aligned pair, and the parts are joined (with the inner race and the roller bearing elements in position) to thus provide an assembled unit having a pair of diametrically opposed circular openings, one with the locating pin therein, and also a pair of spaced semi-circular openings as a result of the third opening in each race half. When placed in the housing, the pin is received in the housing cavity while one of the remaining openings - the circular or either of the semi-circular ones - will be aligned with the lubrication fitting or nipple, so that lubricant introduced through the nipple can pass substantially directly into the cartridge. In addition to the benefits enumerated above, the number of parts to be manufactured is reduced because the halves of the outer race are, except for manufacturing tolerances, which are small, are the same. Thus prior to assembly the various component parts are classified into groups by actual tolerances; thereafter, the parts for an assembly are randomly selected from the respective groups for final assembly.

THE DRAWINGS

FIG. 1 is a front elevational view of a roller bearing assembly manufactured using the invention of this application;

FIG. 2 is a sectional view of the bearing of FIG. 1 taken on line 2—2 of FIG. 1;

FIG. 2A is an enlarged view of the circled portion of FIG. 2 illustrating the movement limiting feature of this invention.

FIG. 3 is a perspective view of the outer race of the bearing of FIG. 1 with the rollers and inner race and other parts omitted and which illustrates this invention;

FIG. 4 is a cross-sectional view of an outer race member according to this invention;

FIG. 5 is a front elevational view of an alternative form of a roller bearing assembly manufactured using this invention and especially another form of bearing housing;

FIG. 6 is a partial cross-sectional view, similar to FIG. 2, showing the elongated locating pin cavity in the housing; and FIG. 7 is a sectional view taken on line 7—7 of FIG. 6 showing the elongated plan configuration of the locating pin cavity in the housing.

DETAILED DESCRIPTION

Attention is directed to FIGS. 1 and 2 of the drawings which show a bearing assembly, generally identified as 10, which comprises a pillow block or housing 12, of the split variety, having a base 14 and a cover 16 connected by a plurality of bolts 18. The base 14 is provided with elongated openings 20 for the passage of bolts (not shown) used to mount the bearing assembly on a support. The housing 12 is provided with a central opening 22 defined by an arcuate surface 22A on cover 16 and a complementary arcuate surface 22B on base 14, said opening having a circular vertical section wherever taken and receives therein a bearing cartridge or unit, generally identified as 24. As best shown in FIG. 2A, the opening 22 terminates at a junction 23 with the exterior of the housing. A grease fitting or nipple 26 is connected in an opening in the housing 12 for the passage of lubricant into the housing 12 and to the cartridge or unit 24, as will later be explained.

The bearing cartridge or unit 24, which is insertable and replaceable in the housing as a unit and which is constructed with an outer arcuate surface to engage the arcuate surface of the housing opening so as to be movable in a limited manner and be self-aligning to accommodate shaft misalignment with respect to the support for the housing, comprises an inner race member 28, an outer race 30 and spaced rows of rollers 32, therebetween.

The inner race member 28 comprises a generally cylindrical member having a circular bore 34 to receive a shaft 35 (shown in section in FIG. 1) and spaced, truncated conical inner raceways 36, on which the rollers 32 of a row roll. The rollers 32 of each row are spaced from each other by a retainer 38 as is the usual practice in bearings of this type. The inner race member 28 may be provided with slotted cylindrical extensions 40 surrounded by locking collars 42 to lock the inner race member 28 to the shaft 35. Other arrangements of shaft locking means may be provided without departing from the spirit of the invention. For example, the inner race member 28 may be provided with one extension as compared to the two illustrated; locking collars differing from that illustrated may be used; or an entirely different shaft locking system, using wedges may be substituted.

The inner race extensions may be drilled instead of being slotted and a locking collar is then provided having tapped openings to receive Allen screws which extend through the drilled openings to bite into the shaft.

The outer race 30 comprises a pair of like members 44 centrally joined, preferably by being welded together. It has been found that the use of the electron beam welding technique provides a suitable welded structure without substantial distortion of the parts. Each of the members 44 provides an arcuate outer surface 46 which, after assembly provides the arcuate surface which contacts and is movable with respect to the arcuate surfaces 22A, 22B forming opening 22 in the housing 12. Each member 44 is constructed with a truncated conical outer raceway 48 on which the rollers 32 of a row roll. The outer extremities of the members 44 terminate in a cylindrical surface defining a cylindrical ledge 50, the juncture of the surface 46 and the ledge 50 being definitely defined and identified with the reference 51. The ledge 50 is spaced from a substantially parallel portion of the inner race member 28. Sealing means 52 are positioned between the ledge 50 and that portion of the inner race member 28.

The inner extremity of each of the members 44 is grooved, as at 54 and is also provided with semi-circular slots or openings 56, 58 and 60. While shown and described herein as semi-circular in shape, it is to be understood that the shape can be different without departing from the spirit of the invention. As illustrated, the slots or openings 56, 58 are diametrically opposed to one another, that is, are spaced 180° apart; the slot or opening 60 is spaced between the slots 56 and 58, as illustrated, it is spaced approximately 30° from the slot 56. It is to be noted that each member 44 is the same; thus in the manufacturing process, it is only necessary to produce one universal part. During assembly of the bearing cartridge or unit 24, two members 44 are, for the most part, randomly selected from a stock of such parts, arranged with a subassembly of inner race and rows of rollers with their cages, and a locating pin is positioned in one of the diametrically opposed slots, so that the diametrically opposed openings or slots in one of the parts registers with the diametrically opposed openings or slots in the other of the parts (and the locating pin is in proper position) and the two race parts are joined together. During the welding of the members together, the weld is interrupted at the openings. Because of manufacturing techniques, the spacing of the members 44 relative to the rows of rollers is controlled for effecting proper operation and end play and ultimate performance, and each unit or cartridge 24 will be substantially identical in manufacture except for tolerances encountered in the manufacture of the various components. For example, roller assemblies of inner race and rows of rollers are specified with tolerances of about +0.016 inch to −0.016 inch while the outer race parts are manufactured with tolerances on the order of one-half that of the roller assemblies. These can be measured and classified in groups according to tolerance ranges and selectively assembled to provide the ultimate in performance. For the ultimate use, generally it makes no difference whether or not the parts 44 are assembled as illustrated in FIG. 3 or if one of the parts is rotated through 180°; the only consideration is having the diametrically opposed openings in registry with one another.

The lockiing pin 62, when the cartridge or unit is inserted in a housing, is received in a cavity 64 in the housing cover 16. The relationship of the size of the cavity 64 to the locking pin 62 is such to permit the cartridge to be self-aligning, i.e., have some movement between the arcuate surfaces 22 and 46, and thus accommodate shaft misalignment relative to the support for the bearing assembly. This has been described as pivoting movement about the geometric center of the cartridge. The locking pin also limits rotation of the outer race with the shaft 35 which is not desired.

Under severe conditions of misalignment, for example greater than a predetermined amount, such for example on the order of greater than about 3°, it is possible to shear the locating pin which could, under some circumstances, cause damage to the bearing assembly. This condition can be avoided by using the teachings of this invention i.e., the cooperation of the junctures 23 and 51 of the housing and the cartridge, respectively. By choosing the desired relationship between their normal locations, as depicted in FIG. 2 and their meeting location, as in FIG. 2A, the amount of relative movement between the cartridge and the housing can be predetermined.

The provision of an opening 60, spaced from the openings 56 and 58 is such to provide a path for the passage of lubricant to the interior of the cartridge or unit 24. When assembled, an opening 60 is substantially aligned with the lubricant fitting 26 of the pillow block 12, and with the parts 44 joined, as illustrated in FIG. 3, the manner in which the cartridge or unit is positioned in the housing of FIGS. 1 and 2 is of little concern, so long as the locking pin 62 is properly positioned relative to the cavity 64.

According to one aspect of this invention, there is a universal part 44 for use in the manufacture of the cartridge 24; not only is the part 44 universal but also the finished cartridge 24 is substantially universal when constructed and assembled as described. To further elaborate on this, attention is invited to FIG. 5 of the drawings which illustrates a different type of housing, known as a flange block 72. The flange block is constructed of two parts 74 and 76 joined by bolts 78 with flanges 80. The flanges are provided with openings 82 to receive bolts or other means (not shown) to fasten the block to a support (also not shown). The block, when assembled provides an opening 84 defined by arcuate surfaces 85A, 85B (in the same manner as in the block of FIGS. 1 and 2) to receive a bearing cartridge or unit 24 identical as described with respect to FIGS. 1 to 4 inclusive. The flange block 72 is provided with a cavity 86 to receive the locking or locating pin 62 of the cartridge or unit 24; the block 72 is provided with a lubrication nipple or fitting 88 diametrically opposed to the cavity 86. The nipple 88 is screwed into an opening in the housing 74 for the passage of lubricant into the opening 84 and also through an opening provided by the opening 58 of the cartridge 24 into the cartridge to lubricate the rollers thereof. The opening 58 is diametrically opposed to the opening 56 receiving the locking pin 62. Thus, regardless of the block used, there is always provided an opening substantially aligned with the lubrication fitting, so that lubricant can be introduced into the cartridge 24. While not illustrated in detail, the flange block 72 can be constructed with a juncture of the opening 84 and the outside wall to cooperate with the juncture 51 of the cartridge to limit the self-aligning movement of the cartridge relative to the housing.

In FIGS. 6 and 7 there is illustrated another embodiment of the invention in which the cavity, identified here as 92, is elongated in the direction of the shaft 35; the cavity 92 is narrow in the other direction to severely restrict rotation of the outer race 46 with the shaft 35 yet is sufficient in width to freely receive the locating pin 62. The longitudinal extend of the cavity 92 is such to provide the desired pivoting movement of the cartridge 24 to accommodate shaft misalignment, and this dimension can be chosen to limit such pivoting movement, as is desired.

I claim:

1. A method of making a roller bearing cartridge having an inner race with spaced raceways and a two part outer race, each with a raceway, and rows of rollers, each row of rollers contacting the adjacent raceways of the inner and outer races, said cartridge being adapted for use with a housing having an opening for the cartridge and a lubrication fitting and a cavity communicating with the opening, which method comprises;

forming two halves of the outer bearing race each with an arcuate outer surface and a frusto-conical inner surface defining a raceway and a edge having a plurality of semi-circular slots or openings therein, one of said openings being diametrically opposed to another of said openings and a third opening intermediate the opposed openings;

assembling said halves with the opposed openings of one of said halves and the opposed openings of the other of said halves arranged to form a pair of circular openings diametrically opposed to one another and a pair of spaced semi-circular openings;

inserting a pair of rows of roller bearings and an inner race between said halves; inserting a locking pin in one of said circular openings; and joining the so assembled halves to form said cartridge;

said cartridge being adapted to be placed in a housing opening, one of resultant openings in said outer race providing for entry of lubricant from said housing fitting when in a housing, said locating pin being received in said housing cavity when said cartridge is placed in said housing.

2. The method as recited in claim 1, in which said assembled halves are electron beam welded together.

3. The method as recited in claim 1, further comprising the step of forming said two halves of said outer bearing race substantially identical to one another.

4. A roller bearing cartridge for a roller bearing assembly of a housing having an opening for the cartridge, a lubricant fitting and a cavity communicating with the opening, which cartridge comprises:

an inner race having a pair of inner raceways;

an outer race of two parts joined together, each part having an outer arcuate surface and a raceway;

a pair of rows of rollers, the rollers of a row contacting the adjacent inner and outer raceways;

said outer race parts being substantially the same and each having a plurality of semi-circular slots or openings therein, one of said openings being diametrically opposed to another of said openings with a third opening being intermediate the opposed openings, such that when assembled and joined the opposed openings of the parts form a pair of circular openings diametrically opposed to one another and the third openings being spaced equally on opposite sides of one of the opposed openings;

a locking or locating pin in one of said circular openings for placement in said housing cavity;

one of the resultant openings in said outer race member being aligned with said housing lubrication fitting and providing for entry of lubricant when the cartridge is inserted into the housing.

5. A roller bearing assembly comprising a housing and a cartridge, said housing having a central opening defined by an arcuate surface to receive the cartridge, said cartridge comprising:

an inner race defining a pair of inner raceways;

an outer race constructed of two halves joined together each having a raceway and when joined defining an outer, arcuate surface, each half of said outer race being substantially the same and having a plurality of semicircular slots or openings therein, one of said openings being diametrically opposed to another of said openings with a third opening being intermediate the opposed openings, such that when assembled and joined the opposed openings of one half form a pair of diametrically opposed circular openings, the third openings of each being semicircular and being spaced on opposite sides of one of said circular openings;

a pair of roller assemblies, the rollers of a pair contacting the adjacent inner and outer raceways;

a locking or locating pin in one of said resultant circular openings;

(said housing having) a cavity in said housing opening into said central opening to receive said locking pin when said cartridge in said central opening and a lubrication fitting spaced from said cavity and opening into said central opening;

one the the remaining resultant openings in said outer race member being substantially aligned with said lubrication fitting and providing for entry of lubricant when the cartridge is inserted into a housing for operation.

6. A roller bearing cartridge for a roller bearing assembly of a housing having an opening for the cartridge and a cavity communicating with the opening and adapted to be fixed to a support; which cartridge comprises:

an inner race having pair of inner raceways and with a central opening for a rotational shaft;

an outer race having an outer arcuate surface and a pair of outer raceways;

a pair of rows of rollers, the rollers of a row contacting the adjacent inner and outer raceways;

a locking or locating pin extending radially from said outer race and received in said cavity in said housing, said cavity being relatively long in the direction of the shaft as compared to its width in a direction normal thereto, said locating pin cooperating with said cavity to limit the ability of the outer race to rotate with the shaft and to a lesser extent to limit the ability of, yet permit, the pivoting of the cartridge about its geometric center with respect to the housing to accommodate shaft misalignment relative to the housing support.

7. A roller bearing assembly comprising a housing adapted to be fixed to a support and a cartridge, said housing having a central opening defined by an arcuate surface to receive the cartridge, said cartridge comprising:

an inner race member having a pair of inner raceways and an opening for receiving a rotating shaft;

an outer race member having an outer arcuate surface and;

a locking or locating pin extending radially therefrom;

(said housing having) a cavity opening into said central opening of said housing to receive said locking or locating pin (and), said cavity being longer in the direction of the shaft than in width normal thereto;

a pair of rows of rollers, the rollers of a row contacting the adjacent inner and outer raceways;

and locating pin cooperating with said cavity to limit the ability of the outer race to rotate with the shaft and to a lesser degree to limit, yet permit the pivoting of the cartridge about its geometric center with respect to the housing to accommodate shaft misalignment relative to the housing support.

8. A roller bearing assembly comprising a housing adapted to be fixed to a support and a cartridge, said housing having a central opening defined by an arcuate surface to receive the cartridge and a cavity having a length in the direction of said shaft greater than its width normal to said shaft, communicating with said opening, said cartridge comprising:

an inner race having a pair of inner raceways and an opening for receiving a rotating shaft;

an outer race having a pair of outer raceways and an outer arcuate surface;

said outer race being constructed of two halves joined together, each half being substantially the same and having a semi-circular slot or opening therein, such that when assembled and joined the slots or openings form a circular opening:

a pair of rows of rollers, the rollers of a row contacting the adjacent inner and outer raceways;

a locating or locking pin in said circular opening with a portion extending from the arcuate outer surface;

said locking pin being received in said cavity to limit relative rotation of said outer race with said shaft relative to the housing and permitting pivoting movement of said cartridge in said housing about the geometric center of said cartridge to accommodate shaft misalignment relative to the support for the housing;

a cylindrical portion extending outwardly from said outer race and forming a juncture with the arcuate outer surface;

the arcuate surface and the outside walls of said housing forming a juncture which under non-misalignment conditions is spaced from an outer race juncture, said housing juncture acting as a stop means when in contact with an outer race juncture to limit the maximum pivoting of said cartridge about its geometric center under conditions of shaft misalignment.

9. A roller bearing assembly comprising a housing adapted to be fixed to a support and a cartridge, said housing having a central opening defined by an arcuate surface to receive the cartridge and a cavity communicating with said opening, said cartridge comprising:

an inner race having a pair of inner raceways and with a central opening for a rotating shaft;

an outer race having a pair of outer raceways and an arcuate outer surface;

an opening in said outer race, a pair of rows of rollers, the rollers of a row contacting the adjacent inner and outer raceways;

a locating or locking pin in said outer race opening with a portion extending from the arcuate outer surface thereof;

said cavity being longer in the direction of said shaft than in width normal to the direction of said shaft;

said locating pin being received in said cavity to limit relative rotation of said outer race with said shaft relative to the housing and permitting pivoting movement of said cartridge in said housing about the geometric center of said cartridge to accommodate shaft misalignment relative to the support for the housing;

cylindrical portions outwardly extending from said outer race, each forming a juncture with a arcuate outer surface;

the arcuate surface and the outside walls of said housing forming a juncture which under non-misalignment conditions is spaced from an outer race juncture, said housing juncture acting as a stop means when in contact with an outer race juncture to limit the maximum pivoting of said cartridge about its geometric center under conditions of shaft misalignment.

10. A roller bearing cartridge for a roller bearing assembly of a housing having a opening for the cartridge terminating in a juncture with the outer walls thereof, and a cavity communicating with the opening, which cartridge comprises:

an inner race havng a pair of inner raceways and with a central opening for a rotating shaft;

an outer race having at each end a cylindrical shoulder defining a juncture with the arcuate outer surface;

said cavity longer in the direction of said shaft than in width normal to the direction of said shaft;

a locking or locating pin extending from said outer race and received in said housing cavity to limit relative rotation of said outer race in said housing with said shaft while permitting limited relative pivoting movement of said cartridge relative to said housing about its geometric center;

said juncture of said outer race cooperating with the juncture of said housing cavity and walls to function as positive stop means to further limit the pivoting movement of said cartridge.

* * * * *